United States Patent
Kao et al.

(10) Patent No.: US 9,654,927 B2
(45) Date of Patent: May 16, 2017

(54) MOTION DETECTION METHOD AND PORTABLE DEVICE USING THE SAME

(71) Applicant: AthenTek Inc., Taipei (TW)

(72) Inventors: Haoren Kao, Taipei (TW); Chia Cheng Lee, Taipei (TW); Chun-Nan Chen, Taipei (TW)

(73) Assignee: AthenTek Incorporated, Taipei (TW)

( * ) Notice: Subject to any disclaimer, the term of this patent is extended or adjusted under 35 U.S.C. 154(b) by 0 days.

(21) Appl. No.: 14/938,691

(22) Filed: Nov. 11, 2015

(65) Prior Publication Data

US 2016/0192139 A1   Jun. 30, 2016

Related U.S. Application Data

(60) Provisional application No. 62/096,701, filed on Dec. 24, 2014.

(51) Int. Cl.
*H04W 24/00* (2009.01)
*H04W 4/02* (2009.01)
*H04W 64/00* (2009.01)

(52) U.S. Cl.
CPC ......... *H04W 4/023* (2013.01); *H04W 64/006* (2013.01)

(58) Field of Classification Search
CPC .............................. H04W 4/023; H04W 64/006
USPC ........................................................ 455/456.2
See application file for complete search history.

(56) References Cited

U.S. PATENT DOCUMENTS

| | | | |
|---|---|---|---|
| 2011/0304506 A1* | 12/2011 | Choi .................. | G01S 5/021 342/387 |
| 2013/0053091 A1* | 2/2013 | Jorguseski ............ | H04W 24/02 455/524 |
| 2015/0373491 A1* | 12/2015 | Lim ...................... | G01S 5/0257 455/456.1 |

* cited by examiner

*Primary Examiner* — Timothy Pham

(57) ABSTRACT

An example of the invention provides a motion detection method for a portable device. The method includes steps of: generating a first cell location data at a first time point according to signals transmitted by a plurality of base stations; generating a second cell location data at a second time point according to signals transmitted by a plurality of base stations, wherein the first time point and the second time point are two successive time points, and the first cell location data and the second cell location data includes names or identification data of base stations detected by the portable device; determining whether the portable device is moved according to the first cell location data and the second cell location data.

10 Claims, 4 Drawing Sheets

MOTION DETECTION METHOD AND PORTABLE DEVICE USING THE SAME

CROSS REFERENCE TO RELATED APPLICATIONS

This application claims the benefit of U.S. Provisional Application No. 62/096,701 filed at Dec. 24, 2014, the entirety of which is incorporated by reference herein.

BACKGROUND OF THE INVENTION

Field of the Invention

This invention relates generally to a method for determining the motion of mobile devices in a wireless network Description of the Related Art Recently, electronic devices, such as handheld devices, have become more and more technically advanced and multifunctional. Due to increased convenience and functions of the devices, these devices have become necessities of life. Among the functions embedded in the handheld device, such as a cell phone, positioning function may be one useful function for the user.

One well-known positioning function is the Global Positioning Satellite (GPS) positioning system. Another example of position positioning function utilizes radio signals from base stations whose locations are known. These positioning system are useful and can provide accurate position information. However, if the portable device is not equipped with the corresponding hardware module and software, the portable device cannot provide the positioning function for the user. Furthermore, the demands for increased power efficiency and an extended battery life become ever-increasing. Nevertheless, the positioning application has added considerable power requirements to mobile devices, as these applications frequently employ long-range communication to receive navigation data and upload the positioning information.

In some cases, the user does not need the accurate positioning function, thus, a positioning function without support of known positioning hardware is provided in this application. The accuracy of the proposed positioning function may not as good as other well-known positioning function, such as GPS system, but is enough for some specific function of the portable device.

BRIEF SUMMARY OF THE INVENTION

An embodiment of the invention provides a motion detection method for a portable device. The method includes steps of: generating a first cell location data at a first time point according to signals transmitted by a plurality of base stations; generating a second cell location data at a second time point according to signals transmitted by a plurality of base stations, wherein the first time point and the second time point are two successive time points, and the first cell location data and the second cell location data comprises names or identification data of base stations detected by the portable device; determining whether the portable device is moved according to the first cell location data and the second cell location data.

Another embodiment of the invention provides a portable device with motion detection function. The portable device comprises a detection module, a memory and a motion detection module. The detection module receives and analyzes signals from base stations to retrieve information of the base stations wireless connected to the portable device. The memory stores the information of base station. The motion detection module reads the information of base station and determines whether the portable device is moved according to the information of base stations stored in the memory.

Another embodiment of the invention provides a motion detection system including a portable device and a network server. The portable device is wireless connected to a plurality of base stations and retrieves information corresponding to the base stations according to signals transmitted by the base stations. The network server determines whether the portable device is moved according to the information transmitted from the portable device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
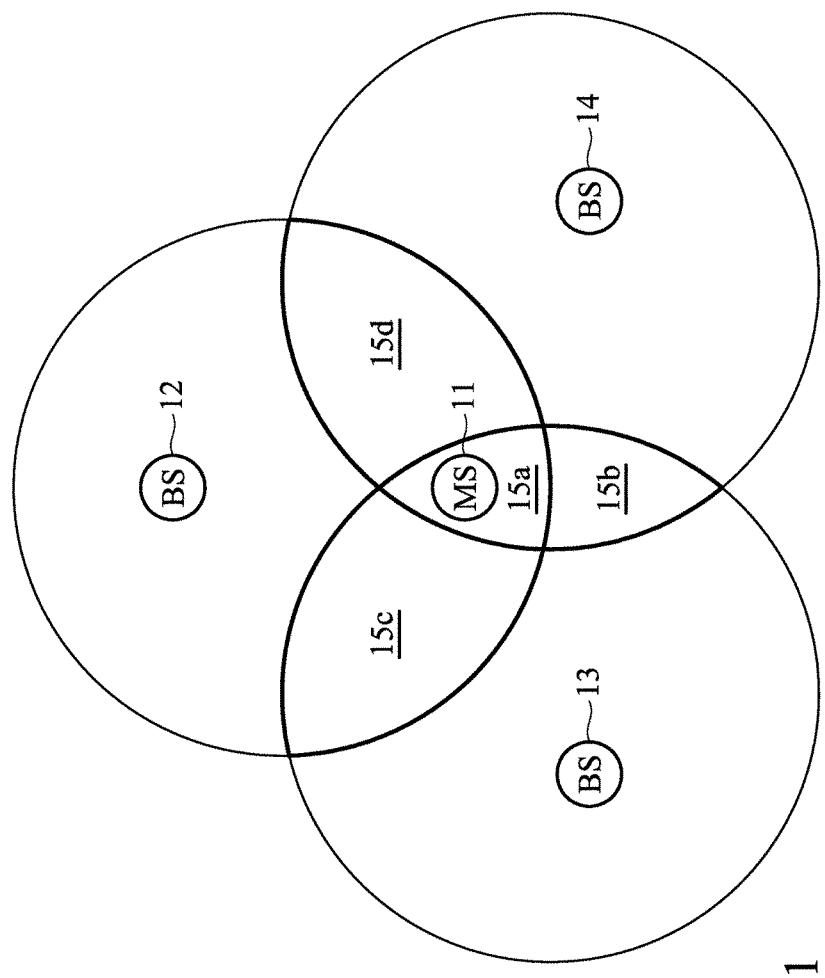
FIG. 1 is a schematic diagram of a communication system.

FIG. 1 is a schematic diagram of a communication system. In FIG. 1, a mobile station 11, such as a portable device or mobile device, is able to connected to one of the base stations 12~14 in the area 15a. The mobile station 11 will acquire information of the base stations 12~14, such as an identification data, cell ID or base station name, according to the area where the mobile station 11 stays. For example, when the mobile station 11 stays at the area 15a, the mobile station 11 acquire information:

CL(t1)=[(cell_id_1), (cell_id_2), (cell_id_3)]

The parameter t1 means a receiving time of the base station information CL, which is an abbreviation of cell location. The parameter cell_id_1 is the name of the base station 12. The parameter cell_id_2 is the name of the base station 13. The parameter cell_id_3 is the name of the base station 14.

When the mobile station 11 stays at the area 15b, the mobile station 11 acquire information:

CL(t2)=[(cell_id_2), (cell_id_3)]

Obviously, we can find that the mobile station 11 does not receive the information of the base station 12 because the mobile station 11 moves out the signal coverage of the base station 12.

Similarly, when the mobile station 11 stays in the area 15c, the mobile station does not receive information of base station 14, and when the mobile station 11 stays in the area 15d, the mobile station does not receive information of base station 13.

Thus, the application provides a method for a positioning method according to the information provided by the base stations.

Note that the communication system in FIG. 1 is described by three base stations, but the number of the base stations is not limited to three. Furthermore, the information provided by the base stations may comprise other data, such as signal strength.

Figure 2:
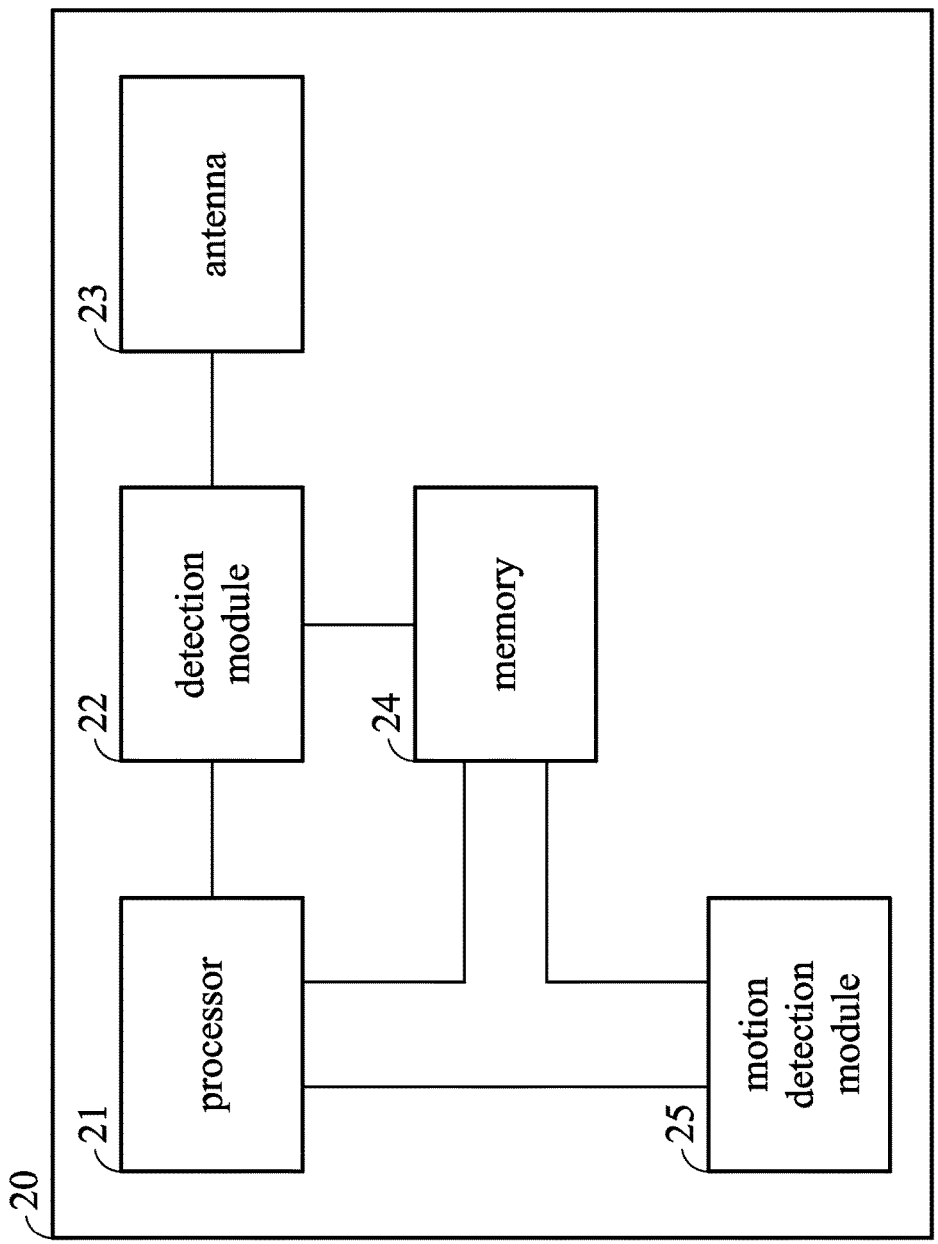
FIG. 2 is a schematic diagram of a portable device with a motion detection function according to an embodiment of the invention.

FIG. 2 is a schematic diagram of a portable device with a motion detection function according to an embodiment of the invention. The portable device 20 comprises a processor 21, a detection module 22, an antenna 23, a memory 24 and a motion detection module 25. The motion detection module 25 and/or detection module 22 may be a program executed by the processor 21, a hardware circuit or a firmware executed by an embedded controller.

The antenna 23 receives/transmits signal from/to the base stations. The detection module 22 receives and analyzes signals from the antenna to retrieve information of base stations wireless connected to the portable device 20. The detection module 22 stores the information of base stations in the memory 24. Then, the motion detection module 25 determines whether the portable device is moved according to the information of base stations in the memory 24. The operation of motion detection module 25 is described as following.

First, the detection module 22 receives successive signals from the antenna 23 and retrieve information of base stations wireless connected to the portable device 20 as following:

CL(t1)=[(cell_id_1), (cell_id_2), (cell_id_3), (cell_id_4)]

CL(t2)=[(cell_id_1), (cell_id_2), (cell_id_5), (cell_id_6), (cell_id_7)]

CL(t3)=[(cell_id_2), (cell_id_5), (cell_id_6), (cell_id_8), (cell_id_9)]

CL(t4)=[(cell_id_2), (cell_id_5), (cell_id_6), (cell_id_8), (cell_id_9)]

The above cell location data is received by the portable device 20 at four successive time points. The cell location data is stored in the memory 24 and can be accessed by the processor 21 and the motion detection module 25. The cell_id_1 is a name of a base station detected by the portable device 20. It is obviously that the content of data CL(t1) is much different from the data CL(t2), and only two same base stations are detected in time point t1 and time point t2. Thus, the motion detection module 25 determines that the portable device 20 moved during a period between time point t1 and time point t2.

Furthermore, the content of data CL(t3) and the content of data CL(t4) are the same. Thus, the motion detection module 25 determines that the portable device 20 stayed in the same position, or stayed within an area during a period between time point t3 and time point t4.

In a general case, the portable device 20 may receive signals from a plurality of base stations. In one embodiment, the portable device 20 can receive signals from 5 base stations. Thus, the motion detection module 25 can set a parameter indicating how many base stations are changed during at least two time points. For example, the parameter is the number that the base stations do not change during two time points. Take data CL(t2) and data CL(t3) for example, signals from three base stations are received by the portable device 20 are the same at time point t2 and t3, and the motion detection module 25 determines that the portable device 20 is static.

In another example, the cell location data comprises the name of the base station and corresponding signal strength. The information of base stations is described as following:

CL'(t1)=[(cell_id_1, RSSI=−60), (cell_id_2, RSSI=−60), (cell_id_3, RSSI=−60), (cell_id_4, RSSI=−65)]

CL'(t2)=[(cell_id_1, RSSI=−62), (cell_id_2, RSSI=−58), (cell_id_3, RSSI=−63), (cell_id_5, RSSI=−67)]

CL'(t3)=[(cell_id_1, RSSI=−61), (cell_id_2, RSSI=−62), (cell_id_3, RSSI=−61), (cell_id_4, RSSI=−64)]

CL'(t4)=[(cell_id_2, RSSI=−60), (cell_id_5, RSSI=−65), (cell_id_6, RSSI=−55), (cell_id_7, RSSI=−57)]

The above cell location data is received by the portable device 20 at four successive time points. The cell location data is stored in the memory 24 and can be accessed by the processor 21 and the motion detection module 25. The cell_id_1 is a name of a first base station detected by the portable device 20, the cell_id_2 is the name of a second base station and so on.

The value of RSSI indicates signal strength.

At time point t1 and time point t2, only one base station is different. Thus, we can assume that the portable device 20 does not move during a period between time point t1 and time point t2. To ensure the correct of the motion detection, the motion detection module 25 further determines whether the portable device 20 is moved according to the received signal strength of corresponding.

In the cell location data CL'(t1) and CL'(t2), the portable detects the first base station, the second base station and the third base station. The motion detection module 25 then determines whether a signal strength variation is greater than a threshold, such as 10%. Take the first base station for example. The signal strength variation is:

$$[-60-(-62)]/|-60|=3.33\%$$

Therefore, the signal strength variation of the first base station does not exceed the threshold. In the same manner, the motion detection module 25 determines that the signal strength variation of the second base station and the third base station do not exceed the threshold. Thus, the motion detection module 25 determines that the portable device 20 does not move during a period between time point t1 and time point t2.

According to the described paragraphs, the motion detection module 25 can execute a two steps motion detection procedure to determine whether the portable device 20 is moved. In the first step, the motion detection module 25 determines whether the difference of the base stations between two time points exceed a first threshold. In the second step, the motion detection module 25 determines whether the signal strength variation of static cell exceed a second threshold.

Take the cell location data CL'(t1) and CL'(t2) for example. At time point t1 and time point t2, cell_id_1, cell_id_2, and cell_id_3 are the same. Thus, the cell_id_1, cell_id_2, and cell_id_3 is considers as static cells (base stations). The total number of cells detected by the portable device 20 at time point t1 and time point t2 is 4. The difference of the base stations is:

$$3/4=75\%$$

Thus, the motion detection module 25 determines the portable device 20 may be static. Then, the motion detection module 25 determines whether the signal strength variation of static cell exceed a second threshold, such as 10%. As described above, the signal strength variation of each static cell does not exceed the second threshold. Then, the motion detection module 25 determines that the portable device 20 is static.

In this embodiment, the motion detection module 25 determines whether the portable device 20 is static according to cell location data at two successive time points, however, cell location data at three successive time points is preferred for a better result of the motion detection.

In another embodiment, the motion detection module 25 determines static cells at two time points. The static cell complies with the two requirement:

1. The cell id is detected in a first cell location data CL(t1) and a second cell location data CL(t2), wherein t1 and t2 are two successive time points.

2. The signal strength, or called RSSI, difference of the base station that met the first requirement from the first time point t1 to the second time point t2 is less than 10%.

Since the portable device 20 may detect different number of base stations at different, a determination rule to determine whether the portable device 20 is static is described in following, wherein X is the number of detected base stations at time point t1, Y is the number of detected base stations at time point t2, Z is the number of static cells.

1. If the number of detected base stations at time point t1 is equal to the number of detected base stations at time point t2, the determination rule is:

Z/X>=80%

2. If the number of detected base stations at time point t1 is greater than the number of detected base stations at time point t2, the determination rule is:

Z/Y>=80%

3. If the number of detected base stations at time point t1 is less than the number of detected base stations at time point t2, the determination rule is:

Z/X>=80%

Figure 3:
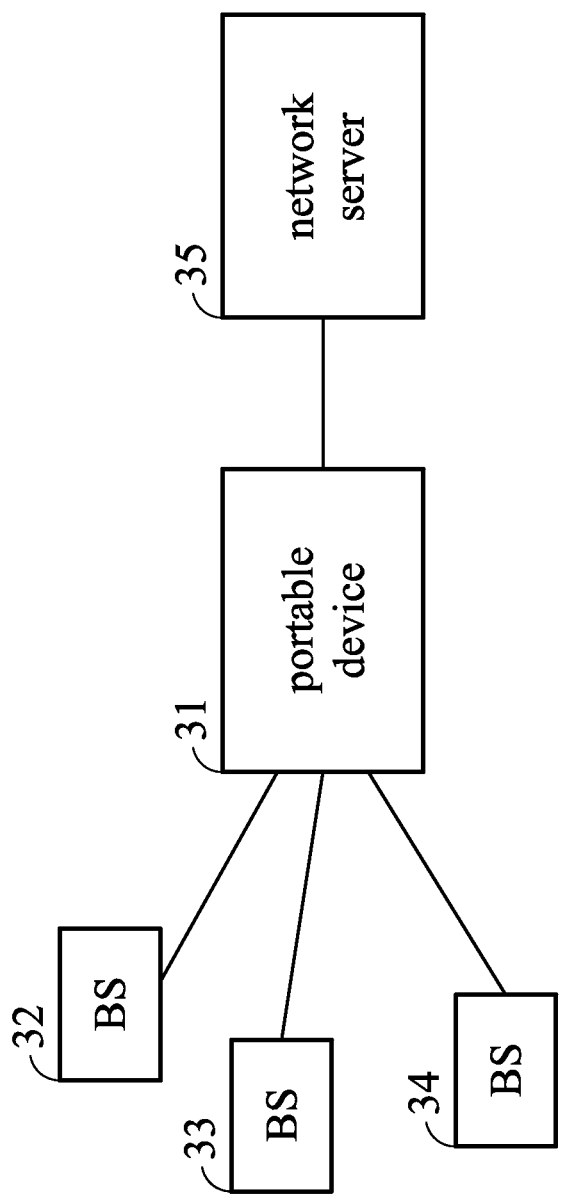
FIG. 3 is a schematic diagram of a system for detecting motion of a portable device according to an embodiment of the invention.

FIG. 3 is a schematic diagram of a system for detecting motion of a portable device according to an embodiment of the invention. The motion detection system comprises a network server 35 to detect a motion of a portable device 31. The portable device 31 receives signals from the base stations 32~34. The portable device 31 is wireless connected to the base stations 32~34 via a first wireless communication protocol, such as a GSM communication protocol, 3G communication protocol or 4G communication protocol. The portable device 31 is wireless connected to network server 35 via a second wireless communication protocol, such as WiFi communication protocol, 3G communication protocol or 4G communication protocol.

The portable device 31 receives signals from the base stations 32~34, and retrieves information corresponding to the base stations 32~34. Then, the portable device 31 transmits the information corresponding to the base stations 32~34 to the network server 35. The network server 35 determines whether the portable device 31 is moved according to the received information.

In one embodiment, the network server 35 determines whether the portable device 31 is moved after the network server 35 receives a request from the portable device 31. The network server 35 comprises a memory for storing the information from the portable device 31, a processor, a motion detection module and a transceiver. When the network server 35 receives the request from the portable device 31, the processor activates the motion detection module. The motion detection module may be a program executed by the processor, a hardware circuit or a firmware executed by an embedded controller.

The information transmitted by the portable device 31 is the same as the cell location data above, such as CL(t1). The operation of the motion detection module of the network server 35 is the same as the operation of the motion detection module 25, and not described here for briefly.

Figure 4:
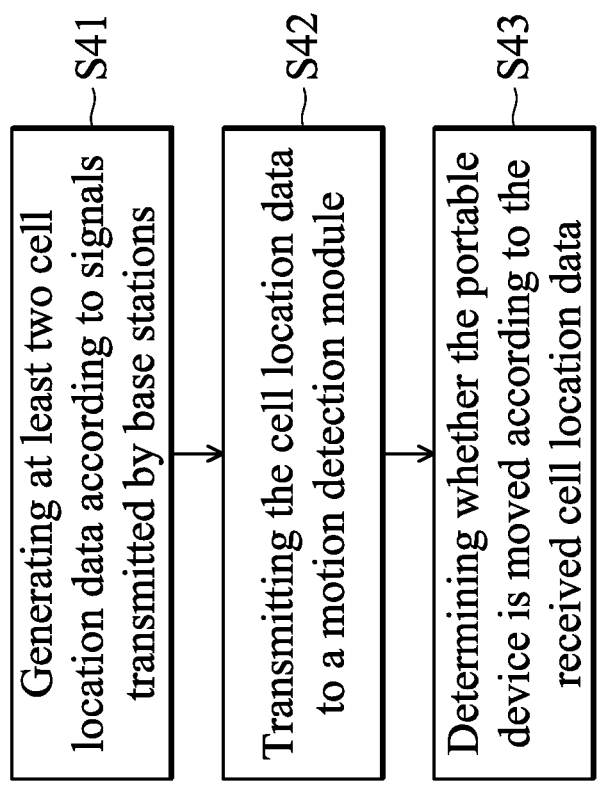
FIG. 4 is a flow chart of a motion detection method according to an embodiment of the invention.

FIG. 4 is a flow chart of a motion detection method according to an embodiment of the invention. In step S41, a detection module embedded in a portable device generates at least two cell location data according to signals transmitted by base stations. In step S42, the cell location data is transmitted to a motion detection module, wherein the motion detection module may be embedded in the portable device or a network server. In step S43, the motion detection module determines whether the portable device is moved according to the received cell location data. The detail of step S43 can be referred to the operation of the motion detection module 25, and not described here for briefly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motion detection method for a portable device, comprising:
    generating a first cell location data at a first time point according to signals transmitted by a plurality of base stations;
    generating a second cell location data at a second time point according to signals transmitted by a plurality of base stations, wherein the first time point and the second time point are two successive time points, and the first cell location data and the second cell location data comprises names or identification data of base stations detected by the portable device; and
    determining whether the portable device is moved according to the first cell location data and the second cell location data;
    wherein the step of determining whether the portable device is moved comprises steps of:
        determining whether a difference of the base stations between the first and second time points exceeds a first threshold;
        determining whether signal strength variation of static base stations exceeds a second threshold, wherein the static base stations are base stations in both the first cell location data and the second cell location data; and
        when the first threshold and the second threshold are not exceeded, the portable device is determined to be static.

2. A motion detection method for a portable device, comprising:
    generating a first cell location data at a first time point according to signals transmitted by a plurality of base stations;

generating a second cell location data at a second time point according to signals transmitted by a plurality of base stations, wherein the first time point and the second time point are two successive time points, and the first cell location data and the second cell location data comprises names or identification data of base stations detected by the portable device; and determining whether the portable device is moved according to the first cell location data and the second cell location data;

wherein the step of determining whether the portable device is moved comprises steps of:
    determining a first number of base stations detected by the portable device at the first time point according to the first cell location data;
    determining a second number of base stations detected by the portable device at the second time point according to the second cell location data;
    determining a third number of static base stations according to the first cell location data and the second cell location data;
    calculating a first ratio between the third number and the first number or a second ratio between the third number and the second number; and
    determining whether the portable device is moved according the first ratio or the second ratio;
    wherein the static base stations are base stations in both the first cell location data and the second cell location data.

3. The motion detection method as claimed in claim 2, wherein when the first number is not greater than the second number, the first ratio is used to determine whether the portable device is moved, and when the first number is greater than or equal to the second number, the second ratio is used to determine whether the portable device is moved.

4. A portable device with motion detection function, comprising:
    a detection module to receive and analyze signals from base stations to retrieve information of the base stations wirelessly connected to the portable device;
    a memory to store the information of base stations; and
    a motion detection module to read the information of base stations and determine whether the portable device is moved according to the information of base stations stored in the memory;
    wherein the detection module generates a first cell location data at a first time point according to signals transmitted by a plurality of base stations and generates a second cell location data at a second time point according to signals transmitted by a plurality of base stations, wherein the first time point and the second time point are two successive time points, and the first cell location data and the second cell location data comprises names or identification data of the base stations detected by the portable device;
    wherein the motion detection module determines whether the portable device is moved by following steps:
        determining whether a difference of the base stations between the first and second time points exceeds a first threshold;
        determining whether signal strength variation of static base stations exceeds a second threshold, wherein the static base stations are base stations in both the first cell location data and the second cell location data; and
        when the first threshold and the second threshold are not exceeded, the portable device is determined to be static.

5. The portable device as claimed in claim 4, wherein the information comprises name of each detected base station and a signal strength of each detected base station.

6. A portable device with motion detection function, comprising:
    a detection module to receive and analyze signals from base stations to retrieve information of the base stations wirelessly connected to the portable device;
    a memory to store the information of base stations; and
    a motion detection module to read the information of base stations and determine whether the portable device is moved according to the information of base stations stored in the memory;
    wherein the detection module generates a first cell location data at a first time point according to signals transmitted by a plurality of the base stations and generates a second cell location data at a second time point according to signals transmitted by a plurality of the base stations, wherein the first time point and the second time point are two successive time points, and the first cell location data and the second cell location data comprises names or identification data of the base stations detected by the portable device,
    wherein the motion detection module determines whether the portable device is moved by following steps:
        determining a first number of base stations detected by the portable device at the first time point according to the first cell location data;
        determining a second number of base stations detected by the portable device at the second time point according to the second cell location data;
        determining a third number of static base stations according to the first cell location data and the second cell location data;
        calculating a first ratio between the third number and the first number or a second ratio between the third number and the second number; and
        determining whether the portable device is moved according the first ratio or the second ratio;
        wherein the static base stations are base stations in both the first cell location data and the second cell location data.

7. The portable device as claimed in claim 6, wherein when the first number is not greater than the second number, the first ratio is used to determine whether the portable device is moved, and when the first number is greater than or equal to the second number, the second ratio is used to determine whether the portable device is moved.

8. A motion detection system, comprising:
    a portable device wirelessly connected to base stations to retrieve information corresponding to the base stations according to signals transmitted by the base stations; and
    a network server to determine whether the portable device is moved according to the information transmitted from the portable device;
    wherein a detection module of the portable device generates a first cell location data at a first time point according to signals transmitted by a plurality of the base stations and generates a second cell location data at a second time point according to signals transmitted by a plurality of the base stations, wherein the first time point and the second time point are two successive time points, and the first cell location data and the second cell location data comprises names or identification data of the base stations detected by the portable device;

wherein a motion detection module of the network server determines whether the portable device is moved by following steps:

determining whether a difference of the base stations between the first and second time points exceeds a first threshold;

determining whether signal strength variation of static base stations exceeds a second threshold, wherein the static base stations are base stations in both the first cell location data and the second cell location data; and when the first threshold and the second threshold are not exceeded, the portable device is determined to be static.

9. A motion detection system, comprising:

a portable device wirelessly connected to base stations to retrieve information corresponding to the base stations according to signals transmitted by the base stations; and a network server to determine whether the portable device is moved according to the information transmitted from the portable device;

wherein a detection module of the portable device generates a first cell location data at a first time point according to signals transmitted by a plurality of the base stations and generates a second cell location data at a second time point according to signals transmitted by a plurality of the base stations, wherein the first time point and the second time point are two successive time points, and the first cell location data and the second cell location data comprises names or identification data of the base stations detected by the portable device;

wherein a motion detection module of the network server determines whether the portable device is moved by following steps:

determining a first number of base stations detected by the portable device at the first time point according to the first cell location data;

determining a second number of base stations detected by the portable device at the second time point according to the second cell location data;

determining a third number of static base stations according to the first cell location data and the second cell location data;

calculating a first ratio between the third number and the first number or a second ratio between the third number and the second number; and determining whether the portable device is moved according the first ratio or the second ratio;

wherein the static base stations are base stations in both the first cell location data and the second cell location data.

10. The motion detection system as claimed in claim 9, wherein when the first number is not greater than the second number, the first ratio is used to determine whether the portable device is moved, and when the first number is greater than or equal to the second number, the second ratio is used to determine whether the portable device is moved.

* * * * *